UNITED STATES PATENT OFFICE.

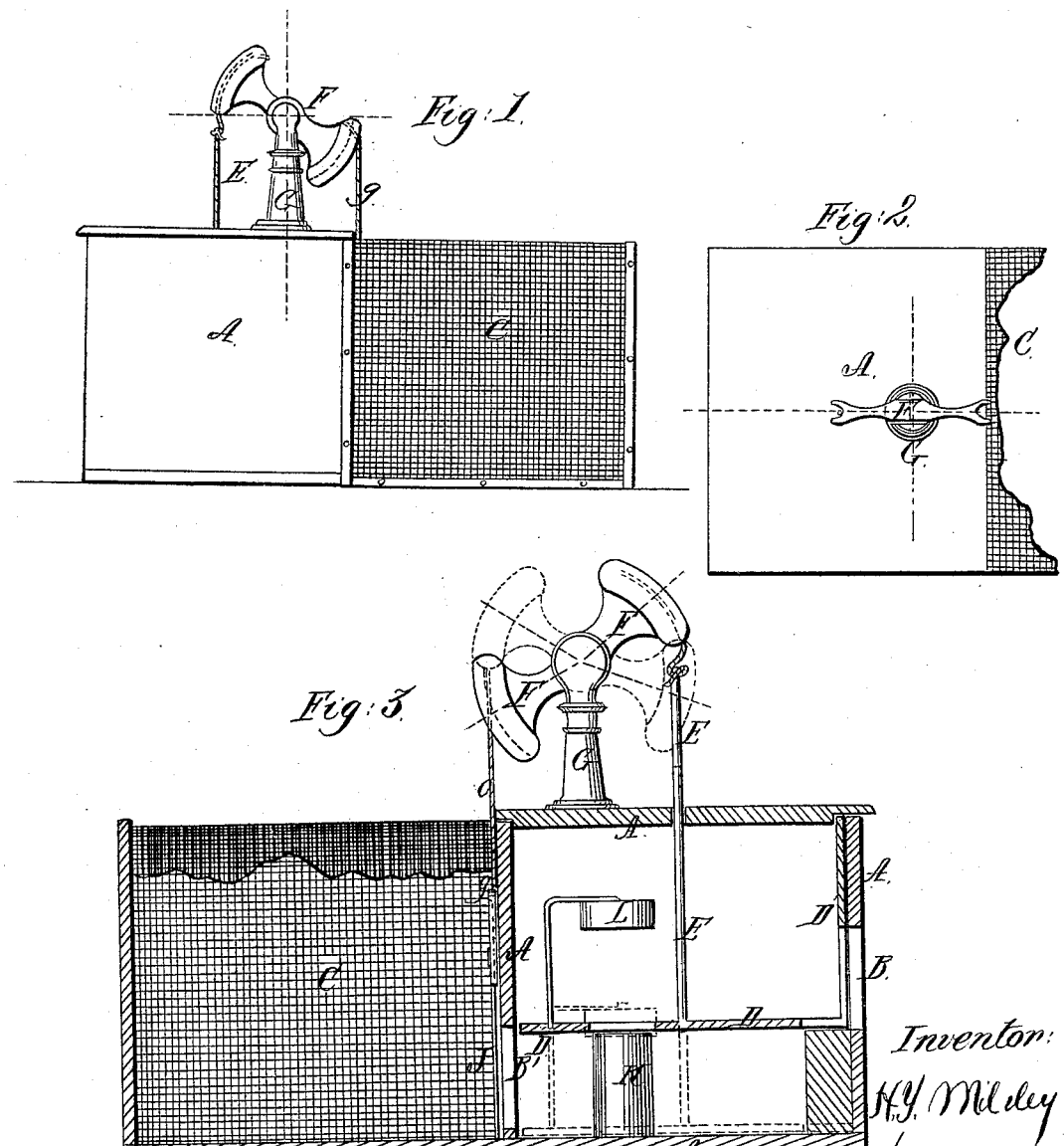

HENRY Y. WILDEY, OF PHILADELPHIA, PENNSYLVANIA.

ANIMAL-TRAP.

Specification of Letters Patent No. 30,269, dated October 2, 1860.

*To all whom it may concern:*

Be it known that I, H. Y. WILDEY, of Philadelphia, in the county of Philadelphia and State of Pennsylvania, have invented a new and Improved Animal-Trap; and I do hereby declare that the following is a full, clear, and exact description thereof, reference being had to the accompanying drawings, making part of this specification, in which—

Figure 1 is a side view outside of the improved trap. Fig. 2 is a top view of a portion of the trap. Fig. 3 is a longitudinal section taken through the trap showing parts for entrapping the animal in two positions.

Similar letters of reference indicate corresponding parts in the three figures.

To enable those skilled in the art to fully understand my invention, I will proceed to describe its construction and operation.

In the drawings A, is a quadrangular box made of any desirable size and closed tightly except two holes B, B', in opposite ends for the entrance and exit of the animal. To one end of this box is applied a wire cage C, which may have a door in it, this cage communicates with the box A, only through the hole B'. The two holes B, B', are arranged in opposite ends of the box A, one above the other the hole B, being an inch or two above the floor of the box and the hole B', being at or near the floor of the box.

D, is a movable shelf, and D', is an upright piece attached in front of the shelf, large enough to close the hole B, when the shelf is depressed in the position indicated in red lines Fig. 3, which piece (D') strikes against the top of the box A, when the shelf ascends, and keeps it in a proper position with relation to the hole B, for the animal to enter the box. When the shelf is in its elevated state the trap is set and the bottom of the shelf is at the top of hole B', so that all communication from the box A, above the shelf with the cage is cut off. E, is a perpendicular rod attached to and projecting up through a hole in the top of box A, this rod is suitably attached, to a lever F, which has its fulcrum in a post G. To the opposite end of this lever F, is attached a cord or small chain g, that passes down one end of the box outside and connects with a weight J, seen in Fig. 3, which weight serves as a balance for the shelf D, to keep the shelf in an elevated position and the trap always set, this weight also closes the hole B', when the trap is set.

K is a small box that passes up from the bottom of box A, through the shelf D, for containing the bait, and L, is a cap attached to the shelf by a rod that covers up the bait, when the shelf is in a depressed state.

The operation of this trap is now as follows: The little animal enters the box A, through hole B, and its weight carries down the shelf D, and raises the weight J, opening the hole B', and closing the hole B, by piece D', the light then attracts the animal into the cage C, when the weight J, will raise the shelf and close the hole B', the parts will then be set again for another mouse.

Having thus described my invention, what I claim as new and desire to secure by Letters Patent, is—

The arrangement of the movable shelf D, box K, cover L and sliding doors J, D', with the rods E, g, and weighted lever F as and for the purposes herein set forth and described.

HENRY Y. WILDEY.

Witnesses:
    JOHN CLOUDS,
    JOHN BRADSHAW.